Patented Aug. 21, 1928.

1,681,692

UNITED STATES PATENT OFFICE.

HARRY P. BASSETT, OF CYNTHIANA, KENTUCKY.

METHOD OF REMOVING AND RECOVERING VOLATILE PLASTICIZERS FROM CELLULOID AND THE LIKE.

No Drawing.     Application filed June 11, 1927. Serial No. 198,312.

This invention relates to the recovery of camphor and similar volatile plasticizers from nitro-cellulose products containing such materials and in its preferred embodiment relates particularly to the recovery of camphor from celluloid scrap.

The principal object of this invention is to provide a simple and economical process for recovering camphor and similar volatile plasticizers from nitro-cellulose products containing such materials without destroying or deleteriously affecting the nitro-cellulose present in such products.

Another object of this invention is to provide a process of treating scraps of celluloid and celluloid products to remove and recover the camphor or other volatile plasticizers employed in the preparation of such products and to recover the nitro-cellulose present in the form of true, unaltered nitro-cellulose suitable for use in the preparation of lacquers and the like.

Other objects and advantages of the invention will become apparent during the course of the following description.

As is well known, in the manufacture of certain nitro-cellulose products, such as celluloid into articles of commerce there is a considerable amount of such products left in the form of scrap or waste. This scrap contains substantial amounts of camphor or other similar volatile plasticizers as well as nitro-cellulose and it has been proposed heretofore to recover such plasticizers from the scrap by heating the scraps in the presence of caustic soda. While the camphor or other plasticizers may be recovered by this method the nitro-cellulose is either destroyed or so deleteriously affected that it is unsuitable for further use in manufacturing processes.

I have discovered that camphor and similar volatile plasticizers can be recovered from nitro-cellulose products of the character referred to without the destruction or injury of the nitro-cellulose by passing a current of steam into a body of such material immersed in water containing an acid maintained at an elevated temperature and conducting off and condensing the volatile products. By this method substantially all of the plasticizing material present is removed and recovered without injury to the nitro-cellulose. This method is relatively inexpensive and does not require elaborate or costly apparatus.

In the preferred practice of my process the scrap material to be treated is introduced into a suitable closed container, such as an autoclave, and covered with water containing an acid. Any acid may be employed but I prefer to employ a nitric acid. In practice a .25 acid solution of nitric acid has been found to be particularly advantageous. The body of weak acid solution and scrap material in the autoclave is raised to an elevated temperature and steam is introduced thereinto. I have found that my process produces the most favorable results if a pressure in excess of atmospheric pressure is maintained in the autoclave and the water therein maintained at boiling temperature, such temperature, of course, varying with the amount of pressure employed. In practice a pressure of from five to twenty-five pounds per square inch will be found to be the most suitable for producing the desired result. Under the conditions outlined substantially all of the camphor or other plasticizers present is distilled off and recovered by condensing such materials in a suitable condensing apparatus.

A substantial measure of success can be obtained in the practice of my process without maintaining super-atmospheric pressure in the autoclave. For example, the plasticizers can be removed by treating the scrap material with steam at approximately 100° C. at atmospheric pressure.

I may with some small measure of practical success treat the scrap without first immersing it in water but this course is not recommended.

After treating the scrap in the manner described the nitro-cellulose will be left in the autoclave in the form of a commercial nitrocotton.

It will be understood that the acid employed is an ionizing influence which serves to increase the rapidity with which the volatile plasticizers are distilled off from the material under treatment.

If nitric acid is employed it not only serves as an ionizing influence but it bleaches the nitro-cellulose from certain colors, such as yellow, blue, green and some reds, thereby leaving the nitro-cellulose substantially white.

The term "celluloid" as it occurs in the specification and claims is used in a broad sense and is intended to cover those nitro-cellulose products commonly known as celluloid, fiberloid and the like, While I have described in detail the preferred practice of my process it is to be understood that the details of procedure outlined may be widely varied without departing from the spirit of the invention or the scope of the subjoined claims.

I claim:

1. The herein described process of removing and recovering volatile plasticizers from celluloid and the like which comprises maintaining a body of the material under treatment in acid state at approximately 100° C., the amount of acid present being insufficient to cause carbonization or decomposition of the cellulose-containing material, passing a current of steam through such body of material to drive off the volatile plasticizing material present, and recovering such plasticizing material.

2. The herein described process of removing and recovering volatile plasticizers from celluloid and the like which comprises immersing the material to be treated in an acid solution, the amount of acid present being insufficient to cause carbonization or decomposition of the cellulose-containing material, maintaining the acid solution at boiling temperature, passing a current of steam therethrough to drive off the volatile plasticizing material present, and recovering the volatile products driven off.

3. The herein described process of removing and recovering volatile plasticizers from celluloid and the like which comprises immersing the material to be treated in water, subjecting the material to an ionizing influence in the form of an acid, the amount of acid present being insufficient to cause carbonization or decomposition of the cellulose-containing material, passing a current of steam therethrough to drive off the volatile plasticizing material present, and recovering the volatile products driven off.

4. The herein described process of removing and recovering volatile plasticizers from celluloid and the like which comprises immersing the material to be treated in water containing an acid, the amount of acid present being insufficient to cause carbonization or decomposition of the cellulose-containing material, maintaining the water at boiling temperature, passing a current of steam therethrough to drive off the volatile plasticizing material present, and recovering the volatile products driven off.

5. The herein described process of removing and recovering volatile plasticizers from celluloid and the like which comprises immersing the material to be treated in water containing nitric acid, the amount of acid present being insufficient to cause carbonization or decomposition of the cellulose-containing material, maintaining the water at boiling temperature, passing a current of steam therethrough to drive off the volatile plasticizing material present, and recovering the volatile products driven off.

6. The herein described process of removing and recovering volatile plasticizers from celluloid and the like which comprises maintaining the material under treatment in acid state at approximately 100° C. and under super-atmospheric pressure, the amount of acid present being insufficient to cause carbonization or decomposition of the cellulose-containing material, passing a current of steam through such material to drive off the volatile plasticizing material present, and recovering such plasticizing material.

7. The herein described process of removing and recovering volatile plasticizers from celluloid and the like which comprises immersing the material to be treated in water containing an acid, the amount of acid present being insufficient to cause carbonization or decomposition of the cellulose-containing material, maintaining the water under super-atmospheric pressure and at boiling temperature, passing a current of steam therethrough to drive off the volatile plasticizing material present, and recovering the volatile products driven off.

8. In the herein described process of removing and recovering volatile plasticizers from celluloid and the like, the steps of subjecting the material to be treated to an ionizing influence in the form of an acid, the amount of acid present being insufficient to cause carbonization or decomposition of the cellulose-containing material, and passing a current of steam therethrough.

In testimony whereof I affix my signature.

HARRY P. BASSETT.